THOMAS & EDWARDS.
Manufacture of Wrought Iron.
No. 49,175. Patented Aug. 1, 1865.
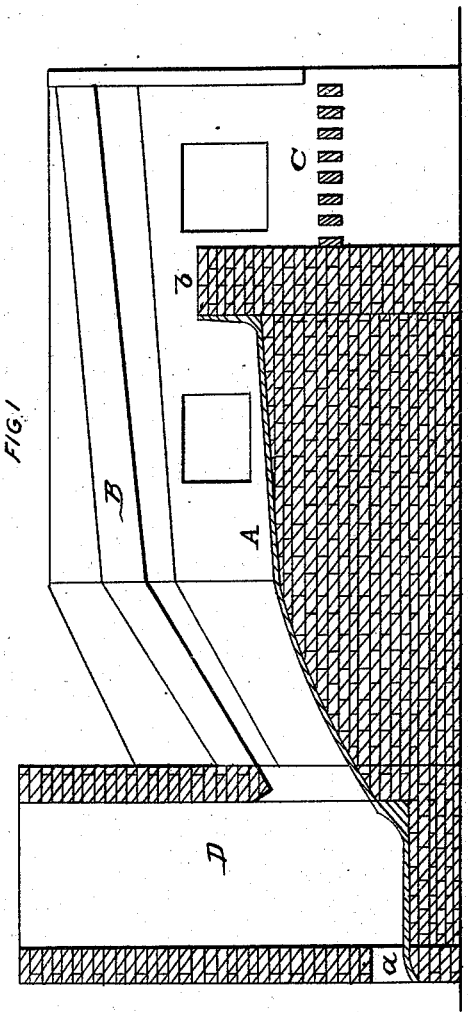
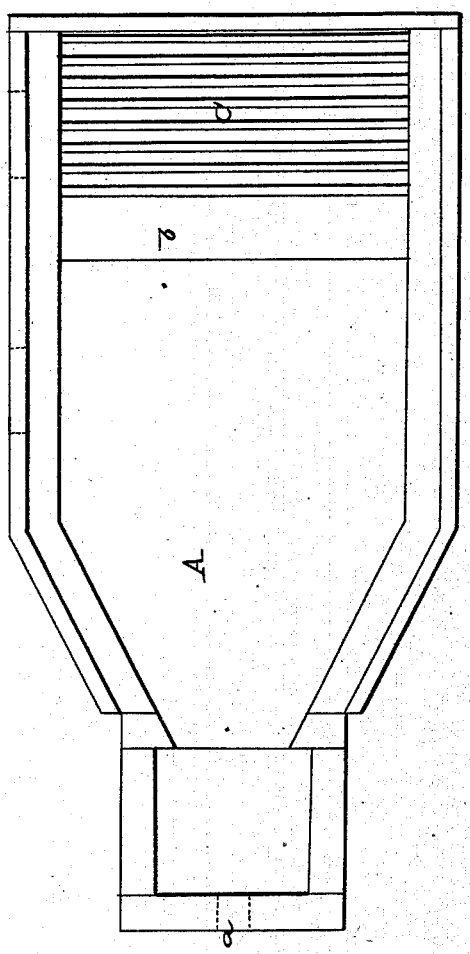

UNITED STATES PATENT OFFICE.

ROBERT THOMAS AND GILES EDWARDS, OF COLUMBIANA, ALABAMA.

IMPROVEMENT IN THE MANUFACTURE OF WROUGHT-IRON.

Specification forming part of Letters Patent No. 49,175, dated August 1, 1865.

*To all whom it may concern:*

Be it known that we, ROBERT THOMAS and GILES EDWARDS, of Columbiana, in the county of Shelby and State of Alabama, have invented a new and Improved Process of obtaining Wrought-Iron direct from the Ore and from the Oxide of Iron; and we do hereby declare that the following is a full, clear, and exact description thereof, reference being had to the accompanying drawings, making a part of this specification, in which—

Figure 1 is a longitudinal section taken in a vertical plane through one form of furnace which we prefer to use in conducting the process. Fig. 2 is a horizontal section through the furnace, taken at a point above the hearth.

Similar letters of reference indicate corresponding parts in the two figures.

The object of this invention is to extract wrought-iron direct from the ore, or from the oxides of iron by mixing the ore, in a finely pulverized state, with any suitable carbonaceous matter, and spreading the mixture thus made in a thin layer over the surface of the hearth of a suitable furnace in such manner that as rapidly as the oxygen is abstracted from the ore by the carbon, carbonic oxides, or other gases, and it is reduced to the state of metal, this metal can be gathered directly from the surface of the mass by "balling," and then removed from the furnace before it has absorbed sufficient carbon to convert it into an impure fusible carbide, as will be hereinafter described.

Another object of our invention is to provide for allowing the fusible scoria or slag to escape from the metal as rapidly as the conversion takes place, thus leaving the metal free to be removed by the process of balling, as will be hereinafter described.

To enable others skilled in the art to understand our invention, we will describe its construction and operation.

In the accompanying drawings we have represented one form of furnace which we prefer to employ in conducting our process of treating the ores or the oxides of iron. This furnace consists of an elevated hearth, A, having an inclined surface, and covered by an arch, B.

C is the fire-chamber, and D a stack or chimney, at or near the base of which is an opening, *a*, for the escape of the melted scoria or slag from the hearth A, as will be hereinafter described. The side walls of this reverberatory furnace have openings through them for admitting of the introduction of the material to be treated into the furnace, and the removal of the metal therefrom. The hearth A inclines from the fire-wall *b* to the outlet *a*, and that portion of this hearth upon which the ore is treated may be less inclined than that portion over which the melted slag flows after it escapes from the metal. This will facilitate the escape of the slag from the furnace. The surface of this hearth A should be covered with sand or some other refractory substance; or the hearth may be constructed entirely of a porous substance which will resist heat and allow the melted scoria or slag to flow freely over its surface or through its interstices.

Before treating the ore by our process it may be roasted for the purpose of driving off some of its impurities and rendering it more friable. It is then reduced to a fine state by the aid of suitable machinery, and mixed with pulverized carbonaceous matter—such, for instance, as anthracite coal, bituminous coal, charcoal, or coke, the latter two of which are preferable on account of their being nearly free from sulphur or other substance which would injure the metal. These substances being intimately mixed in suitable proportions, hereinafter to be mentioned, the mass is introduced into the furnace and spread evenly and in a thin layer over the surface of the hearth A. If the furnace has been previously heated, (which should be the case,) the conversion will soon take place, and a thin film or coating of wrought-iron will appear upon the surface of the substances upon the hearth. This metal is now rapidly removed by balling or gathering it by means of a rod, commencing by rolling from one end of the hearth to the other and taking up the metal from the surface, so as to leave a fresh surface of the ore exposed to be acted upon by the heat and gas. This operation of balling from the surface is continued as long as there is any metal left upon the hearth, care being taken not to stir the ore during the process of conversion.

The explanation of this process is as follows: The carbon is converted into carbonic acid, which, upon coming in contact with the red-hot coal, is reduced to a state of carbonic oxide, which in its turn abstracts the oxygen from the iron ore, thus rendering it in the state of metal at the surface of the layer of ore and coal. By removing this metal as rapidly as it is set free new surfaces of the ore are exposed to a similar chemical action, and the metal will not be allowed to absorb carbon and be converted into an inferior cast-iron or be reduced to cinder. A small portion of the iron in the state of protoxide combines with the ore to form a fusible scoria or slag, which, as rapidly as it forms, flows down the inclined hearth and escapes from the furnace.

If desirable, a suitable quantity of lime or any other suitable flux may be used by mixing it with the ore and coal before their introduction into the furnace.

The proportions of pulverized ore and coal which we prefer to adopt and which give the best result are about thirty pounds of coal to every hundred pounds of the pulverized ore. We do not, however, confine our invention to these proportions, as they may be varied according to the character of the ore which is to be treated.

By our invention the only manipulation which is required is the introduction of the mixture of ore and coal into the furnace, and the balling or agglutinating of the metal into balls by rolling a ball of iron back and forth over the surface which is exposed to the immediate action of the fire and gas. These balls are then worked by means of hammers or squeezers in the usual manner of treating balls of wrought-iron from a common puddling-furnace.

It is essential, in conducting our process, that the layer of ore and coal should not be stirred, for in this event the metal will take up too much carbon, and consequently it will be converted into an inferior cast-iron or reduced to cinder, giving no good result; and then, again, if the metal be left too long in the furnace after it has been set free, it will carbonize and be converted either into steel or cast-iron.

We have described the disposition of the ore and coal upon the hearth of the furnace as being in a thin layer. In some cases the layer may be very thick, or the ore and coal may be piled up, but in all cases these substances must be so disposed that the metal can be balled from the surface of the pile or layer.

Having thus described our invention, what we claim as new, and desire to secure by Letters Patent, is—

1. Extracting wrought-iron direct from its ore or from the oxide of iron by subjecting a layer of pulverized ore which is mixed with carbonaceous matter to the action of heat and balling the metal as rapidly as it is set free from the surface of said layer, substantially as described.

2. Conducting the within-described process, substantially as described, upon an inclined or porous surface, substantially as set forth.

ROBERT THOMAS.
GILES EDWARDS.

Witnesses:
R. T. CAMPBELL,
E. SCHAFER.